United States Patent [19]

Reeder

[11] Patent Number: 4,600,567

[45] Date of Patent: Jul. 15, 1986

[54] SULFUR OXIDES SCRUBBING PROCESS

[75] Inventor: Perry E. Reeder, Valley Center, Kans.

[73] Assignee: Koch Refining Company, Wichita, Kans.

[21] Appl. No.: 690,640

[22] Filed: Jan. 11, 1985

[51] Int. Cl.$^4$ .............................................. C01B 17/00
[52] U.S. Cl. .................................... 423/242; 208/113
[58] Field of Search .............................. 208/113, 120; 423/242 A, 242 R, 244 A, 244 R

[56] References Cited

U.S. PATENT DOCUMENTS

| | | | |
|---|---|---|---|
| 3,520,649 | 7/1970 | Tomany et al. | 423/242 |
| 3,852,408 | 12/1974 | Ewan et al. | 423/242 |
| 3,906,078 | 9/1975 | Hausberg et al. | 423/242 |
| 3,970,740 | 7/1976 | Reeder et al. | 423/242 |

*Primary Examiner*—Gregory A. Heller
*Attorney, Agent, or Firm*—Kokjer, Kircher, Bradley, Wharton, Bowman & Johnson

[57] ABSTRACT

A process for removing catalyst fines and more than 99% of sulfur oxides in the regenerator effluent gas of a fluid catalytic cracking system, which comprises contacting within a venturi structure a gaseous effluent containing sulfur oxides with a liquid scrubbing mixture; passing the admixture of said gaseous effluent and liquid scrubbing mixture through a constricted passage of the venturi structure to increase the velocity thereof; separating the admixture into a liquid portion and a gas portion; delivering the gas portion of the separation step to a packed tower beneath the packed section thereof; contacting the gas portion with liquid scrubbing mixture in the packed section of the tower to form a gaseous overhead effluent substantially free of sulfur oxides and a bottoms liquid; combining the bottom liquid from the packed section of the tower with the liquid portion from the separating step to form a combined liquid bottoms; adjusting the pH of the combined liquid bottoms with a basic solution to form a liquid scrubbing mixture; and dividing the liquid scrubbing mixture into a tower bottoms products, a first recycle stream providing the liquid scrubbing mixture to the venturi structure, and a second recycle stream providing the liquid scrubbing mixture to the packed tower.

18 Claims, 1 Drawing Figure

SULFUR OXIDES SCRUBBING PROCESS

FIELD OF THE INVENTION

This invention relates to a method for the removal of solid particulates and acidic gases from gaseous mixtures produced in the process of regenerating catalysts employed in the catalytic cracking of hydrocarbons. In addition to removal of catalyst particulates, this invention particularly relates to the removal of more than 99% of sulfur oxides present in such gaseous mixtures.

BACKGROUND OF THE INVENTION

The gaseous mixture produced in the regenerator of fluid catalytic cracking process systems contains solid particulates, including catalyst fines, and acidic gases, such as, sulfur oxides. It is desirable to lower the level of solid particulates and acidic gases from such a gas before it is introduced into the atmosphere so as to minimize the detrimental effect of these pollutants to the ecology. It is known that solid particulates can be removed from gases by wet scrubbing methods including scrubbing gases in jet ejector type venturi scrubbers in which a scrubbing liquid, under pressure, enters the venturi through a spray nozzle. The velocity of the liquid spray creates a draft in a chamber of the venturi scrubber and causes gases or vapors to be drawn into the scrubber body and through a constricted passage of the scrubber wherein intimate mixing of scrubbing liquid and gas occurs. Generally, the effluent of the scrubber (which may be one or more venturi structures in series or in parallel) is passed to a separator in which the contaminated liquid is separated from the cleaned gas. It is also known that acidic or basic materials may be added to the scrubbing liquid to neutralize or absorb basic or acidic contaminants that may be present in the gas subjected to the wet scrubbing treatment.

Although many types of venturi wet gas scrubbing systems have been proposed to reduce the level of particulates and acidic gases from gaseous mixtures prior to their discharge to the atmosphere, the suitability of any specific wet scrubbing system for the efficient removal of solid particulates and other contaminants from gaseous mixtures has been difficult to predict. The nature of the carrier gas, the nature and size of the solid particulate contaminants and the nature of the pollutant gas are factors which will affect the operability and efficiency of removal of contaminants by the known venturi wet gas scrubbing methods.

Heretofore, it has been found that solid particulates, including cracking catalyst fines, condensable contaminants and acidic gases, such as, sulfur oxides, can be reduced to an appropriate level in the gaseous mixture that has been produced in the regenerator unit of a fluid catalytic cracking system by a wet gas scrubbing process carried out under specified conditions, utilizing a jet ejector type of venturi scrubber. Such a method has been disclosed in U.S. Pat. No. 3,970,740 by Reeder and Williams, issued July 20, 1976 and entitled "Wet Scrubbing Process", which is incorporated by reference herein.

The process of U.S. Pat. No. 3,970,470 proved effective in industrial applications to remove from 85 to 90% of the catalyst fines present in the regenerator off gas of a fluid catalytic cracking system and to remove up to 95% of sulfur dioxide present in the off gas. It is anticipated, however, that sulfur dioxide emissions will be even more stringently controlled in the future. Accordingly, there is a need in the industry for an improved process to effectively removing both catalyst particulates and more than 95% of sulfur oxides in the regenerator effluent gas of a cat cracking system. The primary objective of this invention is to fulfill this need.

Other and further objects of the invention, together with the features of novelty appurtenant thereto, will appear in the course of the following description.

SUMMARY OF THE INVENTION

In accordance with the invention, there is provided a process for removing catalyst fines and more than 99% of sulfur dioxide and sulfur trioxide in the regenerator effluent gas of a fluid catalytic cracking system, which comprises contacting within a venturi structure a gaseous effluent containing sulfur oxides with a liquid scrubbing mixture; passing the admixture of said gaseous effluent and liquid scrubbing mixture through a constricted passage of said venturi structure to increase the velocity thereof; separating the admixture into a liquid portion and a gas portion; delivering said gas portion of said separation step to a packed tower beneath the packed section thereof; contacting said gas portion with liquid scrubbing mixture in the packed section of said tower to form a gaseous overhead effluent sutstantially free of sulfur oxides and a bottoms liquid; combining said bottom liquid from said packed section of said tower with said liquid portion from said separating step to form a combined liquid bottoms; adjusting the pH of said combined liquid bottoms with a basic solution to form a liquid scrubbing mixture; and dividing said liquid scrubbing mixture into a tower bottoms products, a first recycle stream providing said liquid scrubbing mixture to said first contacting step, and a second recycle stream providing said liquid scrubbing mixture to said second contacting step.

DESCRIPTION OF THE DRAWING

In the accompanying drawing which forms a part of the specification and is to be read in conjunction therewith, the FIGURE is a diagrammatic flow plan of a preferred embodiment of the invention.

The process of the invention is suitable for removing solid particulates and acidic gases from gaseous effluents of refinery processes, especially low pressure gaseous effluents. The process of the invention is particularly suitable for removing solid particulates and acidic gases from a gaseous mixture produced in the regenerator of a catalytic cracking process. As used herein, the terms "acidic gases" and "acid gases" refer to gases containing sulfur oxides, such as sulfur dioxide and sulfur trioxide.

Figure 1:
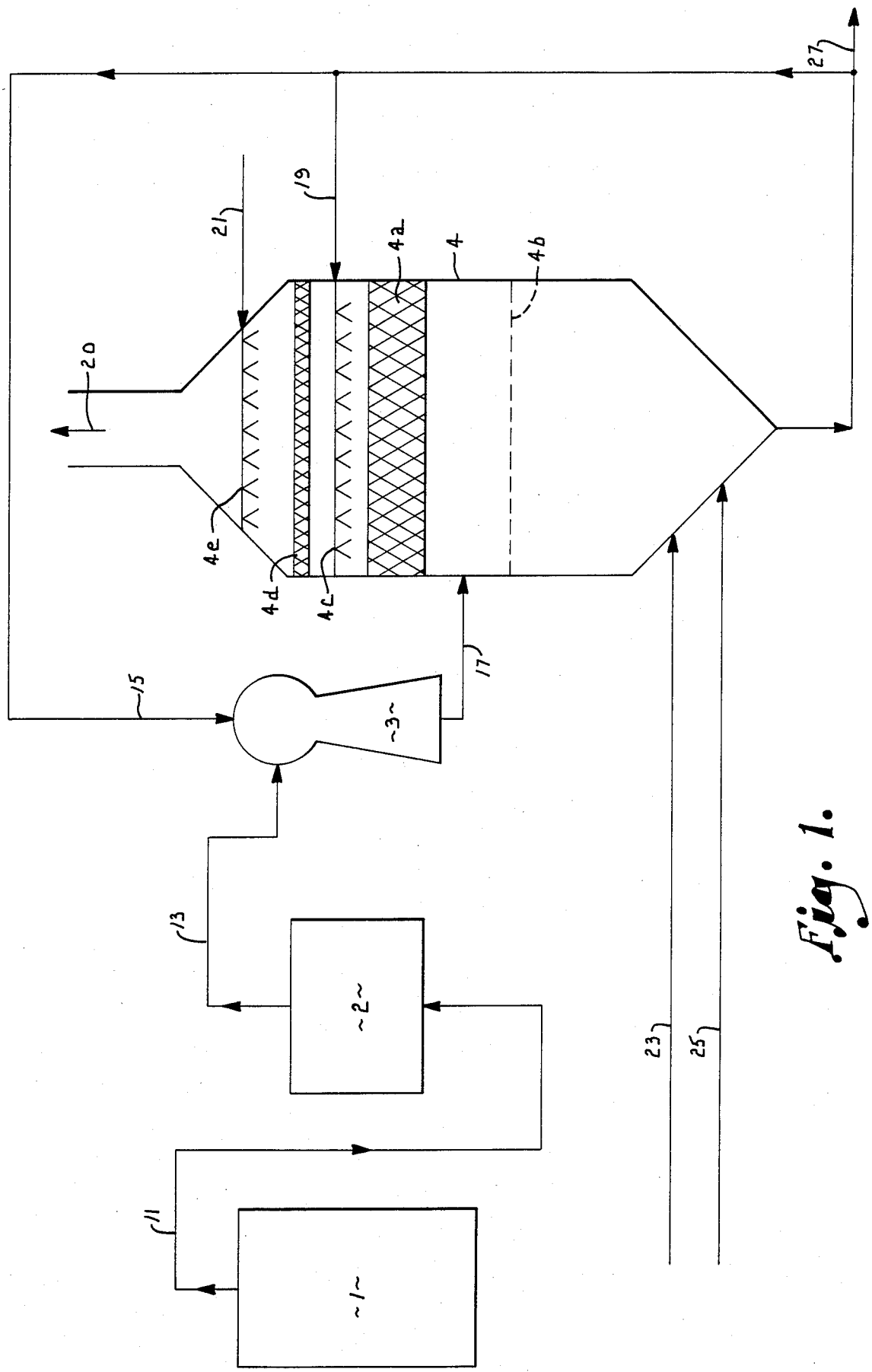

The process is especially suited for the treatment of gaseous mixtures produced in the regenerator of fluid catalytic cracking process units. Fluid catalytic cracking processes are well known. During the cracking reaction, carbonaceous material deposits on the catalyst particles and thereby lowers their catalytic activity. It is, therefore, the usual procedure to circulate a stream of partially deactivated catalyst particles from the catalytic reaction zone to a regeneration zone where the carbonaceous deposit is burned from the catalytic particles by combustion in the presence of an oxygen-containing gas, such as air. The regeneration may be conducted at a temperature within the range of 800° to 1500° F. When the regeneration is conducted in the lower temperature range, that is, between about 800°–1300° F., the regenerator gaseous effluent will contain about 8 to 14 mole % carbon monoxide (on a dry basis). When it is desired to lower the CO content of this gas, it is the conventional practice to pass the gas to a combustion zone, such as, a CO boiler or furnace and thereby convert at least a portion of the CO to $CO_2$. When the regeneration process has been conducted in the higher temperature range, that is, in the range varying from about 1300° to 1500° F., the regenerator gaseous effluent will contain only about zero to 12 mole % CO since a portion of the initially formed CO is converted to $CO_2$ in the high temperature regeneration. In the latter case, the regenerator gas is usually not passed through a CO boiler or furnace. In many known processes, the catalytic regeneration is conducted at low pressures, for example, below about 30 pounds per square inch gauge (psig). The outlet pressure of the gaseous effluent of such a low pressure regenerator will therefore also be low. Furthermore, when a regenerator gas is burned in combustion vessel such as a CO boiler or furnace, the gases exiting from the combustion vessel will have low pressures, typically, in the range of about −0.1 to 1.0 psig.

The gas cleaning process of the present invention is applicable to fluid catalytic cracking regenerator gas obtained in low or high temperature regeneration processes and which may, optionally, subsequently have been burned in a combustion zone prior to subjecting the gas to the wet scrubbing treatment.

Typical compositions of the regenerator effluent gas and regenerator gas which subsequently has been burned in a CO boiler are given in U.S. Pat. No. 3,970,740, previously incorporated by reference.

Referring to the FIGURE, a gaseous effluent is removed from a fluid catalytic cracking regenerator 1 via line 11 and introduced into a CO boiler 2 where it is burned. The burned regenerator gas emanating from the CO boiler is at a pressure of about −0.05 psig (the pressure may range broadly between about −0.1 and 1.0 psig) and at a temperature of about 400° F. (the temperature may range from about 200° to 1000° F.). The gaseous effluent of the CO boiler comprises carbon dioxide, oxygen, sulfur dioxide, sulfur trioxide, nitrogen, condensable materials, and solid particulates, which are mostly catalyst fines of the cracking catalyst utilized during the fluid catalytic cracking process. The usual catalysts utilized for cracking comprise siliceous materials, such as, silica; amorphous or crystalline (zeolites) silica-alumina; silica-zirconia; silica-magnesia, etc. From about 1 to 40 wt. % of the catalyst particles in the gaseous effluent are under one micron in size. Condensable materials are any of the constituents of the gaseous effluent (excluding water vapor) that would condense out of the gaseous effluent as a solid or as a liquid under standard conditions of temperature and pressure, for example, inorganic materials, such as, sulfate salts, and $H_2SO_4$, as well as, organic materials of hydrocarbonaceous nature. The gaseous CO boiler effluent is removed via line 13 and is introduced into a venturi scrubber 3, without any intermediate compression between the CO boiler 2 and the venturi scrubber 3, where it will contact a stream of an aqueous scrubbing mixture conducted in line 15 and sprayed into the venturi scrubber 3. The gas is introduced into the venturi scrubber at a velocity of about 20 to 80 feet per second, preferably about 40 to 50 feet per second. The scrubbing mixture is introduced into the venturi scrubber 3 at a ratio of 20 to 120 gallons of scrubbing mixture to 1000 cubic feet of gas, preferably at a ratio of 40 to 80 gallons of scrubbing mixture to 1000 cubic feet of gas. Vaporization of water in the scrubbing mixture within the venturi scrubber 3 controls the downstream temperature within the range of 125° to 175° F.

It is critical that the scrubbing mixture be maintained at a pH in the range of 6 to 7.5, preferably between about 6.5 to 7.5. Precise control of the pH will determine the degree of sulfur oxides removed from the gas in the venturi scrubber 3 and the packing 4a.

To control the pH, a basic material is added to the aqueous scrubbing mixture. The basic material may be, for example, a alkali metal hydroxide, ammonia or ammonium hydroxide. In the preferred embodiment of the invention, sodium hydroxide is utilized as the basic material for pH control of the scrubbing mixture. Contact of the scrubbing mixture in line 15 with the incoming gaseous mixture of line 13 removes sulfur oxides from the gas by reaction with the basic material. The scrubbed gas and the scrubbing mixture flow through a constricted flow passage of the venturi scrubber 3 whereby the velocity of the admixture of gas-scrubbing mixture is increased.

The effluent of the venturi scrubber, that is, the mixture of gas and liquid, is removed from the venturi scrubber 3 via line 17 and fed to a packed tower 4 beneath the packing 4a of the tower and above the liquid level (indicated by broken line 4b in the FIGURE) in the bottom portion of the packed tower 4.

In the packed tower 4, the noncondensable gas portion of the venturi scrubber effluent separates from the liquid portion of the effluent and flows upwardly through the packing 4a of the tower. Scrubbing mixture, via line 19 is delivered to a liquid distributor 4c above the packing 4a in the tower. Accordingly, the scrubbing mixture contacts the gas portion for further removal of sulfur oxides and catalyst fines. The gas phase from the packing 4a flows upwardly in the tower through a mist eliminator 4d to help eliminate any liquid entrainment. The scrubbed gas 20 is then discharged from the packed tower 4. An intermittent water wash through line 21 and sprayer 4e is provided for washing and maintenance of the mist eliminator 4d.

Within the bottom of the packed tower 4 is collected the liquid portion from the venturi scrubber effluent and the liquid phase from the tower packing 4a. It will contain suspended solids (catalysts) and dissolved solids, such as, sodium sulfates, sodium sulfites, sodium bisulfites, ammonium sulfates, as well as, condensable liquid contaminants, such as $H_2SO_4$. Make-up water may be introduced into the liquid hold-up zone of the tower 4 via line 23. Basic material, which in the preferred embodiment is sodium hydroxide of about 25° Be, may also be introduced via line 25 into the liquid hold-up zone of the tower 4 to maintain the pH of the scrubbing mixture at the desired level as previously discussed.

At least a portion of the bottoms liquid present in the tower is withdrawn via line 27 as liquid bottoms product. The liquid bottoms product may be removed from the process and, if desired, subjected to further treatment, such as, concentration and removal of solids and treatment of the liquid waste to make it suitable for disposal.

Another portion of the bottoms liquid present in the tower is recycled, through line 15, as scrubbing mixture to the venturi scrubber 3 and another portion is recycled, through line 19, as scrubbing mixture to the packed tower 4.

The process operates in accordance with the foregoing description to effectively remove more than 99% sulfur oxides from the regenerator off gas. Such gas characteristically contains from 100 to 3000 ppm sulfur dioxide. The gas portion delivered to the packed section of the tower 4 will typically contain 5 to 150 ppm sulfur dioxide. To insure that the $SO_2$ absorption in the tower is gas film controlled and independent of the equilibrium $SO_2$ "back pressure" in the scrubbing mixture, the liquid loading of scrubbing mixture to the packing must be greater than 0.35 $gpm/ft^2$. Preferably, the liquid loading will fall within the range of 3 to 10 $gpm/ft^2$ in order to adhieve good wetting characteristics.

Heretofore, the upper limit of sulfur oxides removal efficiency on regenerator off gas has been 95%. The process herein disclosed achieves a sulfur oxides removal efficiency in excess of 99% to substantially improve the quality of the gas discharged to the atmosphere.

From the foregoing it will be seen that this invention is one well adapted to attain all the ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A process for removing sulfur oxides and solid particulates from a gaseous effluent, the steps of said process comprising:
    contacting within a venturi structure a gaseous effluent containing sulfur oxides with a liquid scrubbing mixture;
    passing the admixture of said gaseous effluent and liquid scrubbing mixture through a constricted passage of said venturi structure to increase the velocity thereof;
    separating the admixture into a liquid portion and a gas portion;
    delivering said gas portion of said separation step to a packed tower beneath the packed section thereof;
    contacting said gas portion with liquid scrubbing mixture in the packed section of said tower to form a gaseous overhead effluent substantially free of sulfur oxides and a bottoms liquid;
    combining said bottom liquid from said packed section of said tower with said liquid portion from said separating step to form a combined liquid bottoms;
    adjusting the pH of said combined liquid bottoms with a basic solution to form a liquid scrubbing mixture, said basic solution selected from the group consisting of alkali metal hydroxides, ammonium hydroxide, and ammonia; and
    dividing said liquid scrubbing mixture into a tower bottoms products, a first recycle stream providing said liquid scrubbing mixture to said first contacting step, and a second recycle stream providing said liquid scrubbing mixture to said second contacting step.

2. The process as in claim 1 wherein said gaseous effluent contains from 100 to 3000 ppm sulfur dioxide.

3. The process as in claim 1 wherein said gas portion to said packed tower contains from 5 to 150 ppm sulfur dioxide.

4. The process as in claim 1 wherein greater than 99% of sulfur oxides in said gaseous effluent is removed.

5. The process as in claim 1 wherein the pH of said liquid scrubbing mixture is maintained from 6.5 to 7.5.

6. The process as in claim 1 wherein said basic solution is sodium hydroxide.

7. The process as in claim 1 including the step of adding water to said combined liquid bottoms.

8. The process as in claim 1 wherein said liquid scrubbing mixture is from 5° to 50° F. colder than the temperature of said gaseous effluent.

9. The process as in claim 1 wherein said packed tower is operated at a temperature between 125° to 175° F.

10. The process as in claim 1 wherein liquid scrubbing mixture is delivered to said packed tower at a rate greater than 0.35 $gpm/ft^2$.

11. The process as in claim 1 wherein liquid scrubbing mixture is delivered to said packed tower at a rate of 3 to 10 $gpm/ft^2$.

12. The process as in claim 1 wherein said gaseous effluent is a gaseous mixture produced in a regeneration zone of a catalytic cracking process.

13. The process as in claim 1 wherein said gaseous effluent is a gaseous mixture produced by burning the effluent of a regeneration zone of a catalytic cracking process in a combustion zone.

14. The process as in claim 1 wherein said gaseous effluent is a gaseous mixture produced by burning the effluent of a regeneration zone of a catalytic cracking process in a carbon monoxide boiler.

15. The process as in claim 1 wherein said gaseous effluent comprises catalyst fines, sulfur dioxide, sulfur trioxide, carbon dioxide, oxygen, nitrogen and water vapor.

16. The process as in claim 1 wherein said gaseous effluent includes catalyst fines comprising siliceous material.

17. The process as in claim 1 wherein said gaseous effluent includes catalyst fines comprising amorphous or crystalline silica-alumina or mixtures thereof.

18. The process as in claim 1 wherein said gaseous effluent includes catalyst fines and more than 90% of said catalyst fines are removed from said gaseous effluent and discharged in said tower bottoms product.

* * * * *

REEXAMINATION CERTIFICATE (1679th)
United States Patent [19]
Reeder

[11] B1 4,600,567
[45] Certificate Issued  Apr. 14, 1992

[54] SULFUR OXIDES SCRUBBING PROCESS

[75] Inventor: Perry E. Reeder, Valley Center, Kans.

[73] Assignee: Koch Refining Company, Wichita, Kans.

Reexamination Request:
No. 90/002,150, Sep. 28, 1990

Reexamination Certificate for:
Patent No.: 4,600,567
Issued: Jul. 15, 1986
Appl. No.: 690,640
Filed: Jan. 11, 1985

[51] Int. Cl.$^5$ .............................................. C01B 17/00
[52] U.S. Cl. ..................................... 423/242; 208/113
[58] Field of Search .......... 423/242 A, 242 R, 244 A, 423/244 R; 208/113, 120

[56] References Cited
U.S. PATENT DOCUMENTS

| | | | |
|---|---|---|---|
| 4,021,469 | 3/1977 | Accortt | 261/117 |
| 4,150,096 | 4/1979 | Nelms et al. | 423/242 |
| 4,201,755 | 5/1980 | Nofal | 423/242 |

FOREIGN PATENT DOCUMENTS 2244186  2/1978  Fed. Rep. of Germany .

*Primary Examiner*—Gregory A. Heller

[57] ABSTRACT

A process for removing catalyst fines and more than 99% of sulfur oxides in the regenerator effluent gas of a fluid catalytic cracking system, which comprises contacting within a venturi structure a gaseous effluent containing sulfur oxides with a liquid scrubbing mixture; passing the admixture of said gaseous effluent and liquid scrubbing mixture through a constricted passage of the venturi structure to increase the velocity thereof; separating the admixture into a liquid portion and a gas portion; delivering the gas portion of the separation step to a packed tower beneath the packed section thereof; contacting the gas portion with liquid scrubbing mixture in the packed section of the tower to form a gaseous overhead effluent substantially free of sulfur oxides and a bottoms liquid; combining the bottom liquid from the packed section of the tower with the liquid portion from the separating step to form a combined liquid bottoms; adjusting the pH of the combined liquid bottoms with a basic solution to form a liquid scrubbing mixture; and dividing the liquid scrubbing mixture into a tower bottoms products, a first recycle stream providing the liquid scrubbing mixture to the venturi structure, and a second recycle stream providing the liquid scrubbing mixture to the packed tower.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–18, dependent on an amended claim, are determined to be patentable.

1. A process for removing sulfur oxides and solid particulates from a gaseous effluent, the steps of said process comprising:
    contacting within a venturi structure a gaseous effluent containing sulfur oxides with a liquid scrubbing mixture;
    passing the admixture of said gaseous effluent and liquid scrubbing mixture through a constricted passage of said venturi structure to increase the velocity thereof;
    separating the admixture into a liquid portion and a gas portion;
    delivering said gas portion of said separation step to a packed tower beneath the packed section thereof;
    contacting said gas portion with liquid scrubbing mixture in the packed section of said tower to form a gaseous overhead effluent substantially free of sulfur oxides and a bottoms liquid;
    combining said bottom liquid from said packed section of said tower with said liquid portion from said separating step to form a combined liquid bottoms;
    adjusting the pH of said combined liquid bottoms with a basic solution to form a liquid scrubbing mixture *having a pH in the range of 6 to 7.5*, said basic solution selected from the group consisting of alkali metal hydroxides, ammonium hydroxide, and ammonia; and
    dividing said liquid scrubbing mixture into a tower bottoms products, a first recycle stream providing said liquid scrubbing mixture to said first contacting step, and a second recycle stream providing said liquid scrubbing mixture to said second contacting step.

* * * * *